(12) United States Patent
Carlson et al.

(10) Patent No.: US 11,421,761 B2
(45) Date of Patent: Aug. 23, 2022

(54) MOTOR STOP FOR A THROUGH-FRAME SLIDE OUT SYSTEM

(71) Applicant: Lippert Components, Inc., Elkhart, IN (US)

(72) Inventors: Brian Carlson, South Bend, IN (US); Patrick Quigley, South Bend, IN (US)

(73) Assignee: Lippert Components, Inc., Elkhart, IN (US)

( * ) Notice: Subject to any disclaimer, the term of this patent is extended or adjusted under 35 U.S.C. 154(b) by 19 days.

(21) Appl. No.: 16/708,619

(22) Filed: Dec. 10, 2019

(65) Prior Publication Data

US 2020/0200243 A1 Jun. 25, 2020

Related U.S. Application Data

(60) Provisional application No. 62/782,572, filed on Dec. 20, 2018.

(51) Int. Cl.
*F16H 25/20* (2006.01)
*B60P 3/34* (2006.01)
*F16D 48/06* (2006.01)

(52) U.S. Cl.
CPC ............ *F16H 25/2015* (2013.01); *B60P 3/34* (2013.01); *F16D 48/06* (2013.01); *F16D 2500/10418* (2013.01); *F16H 2025/2075* (2013.01)

(58) Field of Classification Search
CPC .. F16H 25/2015; F16H 2025/204; B60P 3/34; F16D 48/06; F16D 2500/10418

USPC .......................................................... 296/175
See application file for complete search history.

(56) References Cited

U.S. PATENT DOCUMENTS

| | | | | |
|---|---|---|---|---|
| 2,743,623 | A * | 5/1956 | Wells | F16H 25/2015 74/89.39 |
| 3,319,481 | A * | 5/1967 | Goodman | F16H 25/2015 74/89.37 |
| 4,428,710 | A * | 1/1984 | Grisebach | B25J 15/022 901/29 |
| 5,758,918 | A | 6/1998 | Schneider et al. | |
| 6,109,683 | A | 8/2000 | Schneider | |
| 6,116,104 | A * | 9/2000 | Nagai | B23Q 16/001 74/89.32 |
| 6,142,030 | A * | 11/2000 | Nagai | B23Q 1/25 74/89.32 |
| 6,471,275 | B1 * | 10/2002 | Kunz | B60P 3/34 296/171 |

(Continued)

*Primary Examiner* — Jake Cook
*Assistant Examiner* — Gregory Robert Weber
(74) *Attorney, Agent, or Firm* — Nixon & Vanderhye P.C.

(57) ABSTRACT

A motor stop mechanism serves as a stop limit for a motor including an output shaft. The motor stop mechanism includes a motor mounting surface to which the motor is attachable, where the motor output shaft is positionable through the motor mounting surface. A coupler is fixable to and rotatable with the output shaft, and a threaded drive shaft is fixed to and rotatable with the coupler. A trunnion threaded on the threaded drive shaft is displaceable on the threaded drive shaft with rotation of the threaded drive shaft. The trunnion is displaceable between a retracted position and an extended position by forward and reverse rotation of the threaded drive shaft. A stop limit defines the extended position of the trunnion. In use, when the trunnion reaches the stop limit, the motor is stopped.

18 Claims, 11 Drawing Sheets

(56) References Cited

U.S. PATENT DOCUMENTS

| | | | | |
|---|---|---|---|---|
| 6,575,514 B2* | 6/2003 | McManus | ............... | B60P 3/34 |
| | | | | 296/165 |
| 7,229,123 B2* | 6/2007 | Kunz | ............... | B60P 3/34 |
| | | | | 296/165 |
| 7,427,092 B2* | 9/2008 | Wolf | ............... | B60P 3/34 |
| | | | | 296/26.01 |
| 9,933,058 B1* | 4/2018 | Muster | ............... | F16H 25/2015 |
| 10,036,482 B1* | 7/2018 | Wu | ............... | H02K 7/06 |
| 10,094,421 B2* | 10/2018 | Yen | ............... | F16C 33/201 |
| 2008/0084089 A1* | 4/2008 | Hanson | ............... | B60P 3/34 |
| | | | | 296/171 |
| 2012/0150394 A1* | 6/2012 | Schwindaman | ............... | B60P 3/34 |
| | | | | 701/49 |
| 2017/0015285 A1* | 1/2017 | Nebel | ............... | B66F 3/247 |

* cited by examiner

MOTOR STOP FOR A THROUGH-FRAME SLIDE OUT SYSTEM

CROSS-REFERENCES TO RELATED APPLICATIONS

This application claims the benefit of U.S. Provisional Patent Application No. 62/782,572, filed Dec. 20, 2018, the entire content of which is herein incorporated by reference.

STATEMENT REGARDING FEDERALLY SPONSORED RESEARCH OR DEVELOPMENT (Not Applicable)

BACKGROUND

The invention relates to slide-out rooms for recreational vehicles and the like and, more particularly, to a motor stop for a through-frame slide out system.

In order to increase available interior space of recreational vehicles, e.g., motor homes and trailer homes, slide-out rooms or sections have been provided. During transit, these rooms are retracted and stored in the interior of the vehicle or trailer, with the exterior end wall of the slide-out room approximately flush with the adjacent exterior wall of the vehicle or trailer. To use the slide-out room, the vehicle is parked and leveled. The slide-out room is then slid outward from the vehicle, using the slide-out room support system, thereby increasing the interior space of the vehicle.

An exemplary support and drive system is described in U.S. Pat. No. 6,109,683, the contents of which are hereby incorporated by reference.

Existing drive and support systems include a motor-driven shaft that runs perpendicular to a rack and pinion driven frame on which the slide-out room rides. There has been an issue with existing designs with respect to effectively getting a through-frame system to stop at the desired points while preventing the room from running off its track and out of the vehicle.

BRIEF SUMMARY

The system of the described embodiments provides a motor stop for a through-frame slide out system to prevent the slide-out room and its supporting structure from running off the track and out of the vehicle. In some embodiments, a threaded drive shaft is driven by operation of a motor, and a trunnion is threaded on the threaded drive shaft. The trunnion is displaceable on the threaded drive shaft with rotation of the threaded drive shaft between a retracted position and an extended position. A stop limit defines the extended position of the trunnion. When the trunnion reaches the stop limit, the stop limit provides a hard stop that causes the slide system to stop in place and allows for the motor to cease running.

In an exemplary embodiment, a motor stop mechanism effects a stop limit for a motor including an output shaft. The mechanism includes a motor mounting surface to which the motor is attachable, where the motor output shaft is positionable through the motor mounting surface. A coupler is fixable to and rotatable with the output shaft, and a threaded drive shaft is fixed to and rotatable with the coupler. A trunnion threaded on the threaded drive shaft is displaceable on the threaded drive shaft with rotation of the threaded drive shaft, where the trunnion is displaceable between a retracted position and an extended position by forward and reverse rotation of the threaded drive shaft. A stop limit defines the extended position of the trunnion.

The motor mounting surface may include a mounting bracket positioned adjacent the threaded drive shaft, where the motor stop mechanism may further include a track member secured to the mounting bracket, and where the trunnion may engage the track member. The track member may include a track, and the trunnion may include a guide positioned in the track. The guide of the trunnion may be shaped in complement to a shape of the track such that the guide positively engages the track. The stop limit may include at least one jack bolt positioned in the track in a path of the guide.

The motor mounting surface may include a mounting bracket positioned adjacent the threaded drive shaft, and the trunnion may directly engage the mounting bracket. The stop limit may include a stop nut threaded onto the threaded drive shaft. In this context, the stop limit may include a double nut threaded onto the threaded drive shaft.

The mechanism may also include a mounting bracket and a non-driven shaft fixed to the mounting bracket and parallel with the threaded drive shaft. The trunnion may be connected between the threaded drive shaft and the non-driven shaft, and the stop limit may be positioned on the non-driven shaft. The stop limit may be connected between the mounting bracket and the non-driven shaft.

In another exemplary embodiment, a slide-out frame assembly includes a slide-out frame displaceable relative to a fixed frame. The slide-out frame assembly includes a motor including an output shaft, and a drive system coupled with the output shaft and engaging the slide-out frame. The drive system drives the slide-out frame assembly between an inside position and an outside position. The motor stop mechanism of the described embodiments acts between the motor and the drive system. The extended position of the trunnion corresponds to the outside position of the slide-out frame assembly.

The slide-out frame assembly may further include a control circuit connected with the motor that is programmed to cut power to the motor when the trunnion reaches the extended position. In this context, the motor may include a clutch, where the control circuit may be programmed to activate the clutch when the control circuit detects that a torque limit is reached. The slide-out frame assembly may further include a resettable breaker connected between the motor and a power source for the motor, where the control circuit may be programmed to activate the resettable breaker to cut power to the motor when the control circuit detects that a current limit is reached. The control circuit may be programmed to cut power to the motor when the control circuit detects a predetermined current change over a given time period.

The slide-out frame assembly may further include a Hall effect sensor that is configured to measure a power supply and monitor movement data, where the control circuit may be programmed to cut power to the motor based on a signal from the Hall effect sensor. The slide-out frame assembly may further include an in-line torque sensor coupled with the motor, where the control circuit may be programmed to cut power to the motor when the in-line torque sensor detects a torque limit or a predefined change in torque over a given time period. The slide-out frame assembly may further include a limit switch coupled with the motor that is tripped when the trunnion reaches the extended position.

BRIEF DESCRIPTION OF THE DRAWINGS

These and other aspects and advantages will be described in detail with reference to the accompanying drawings, in which.

DETAILED DESCRIPTION

Figure 1:
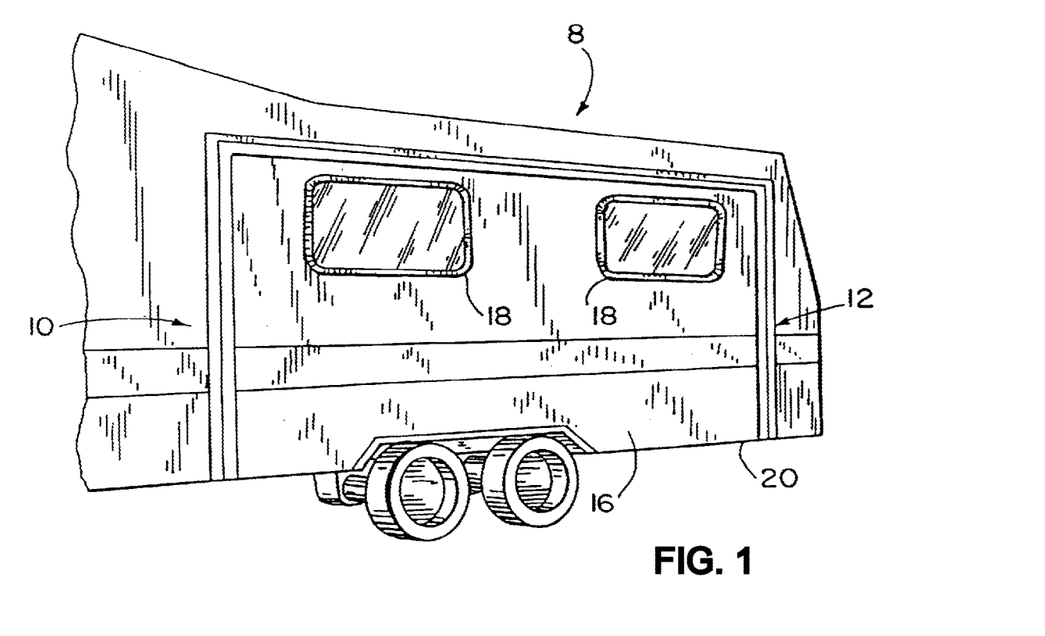
FIG. 1 is a partial perspective view of a slide-out room of a recreational vehicle in a retracted position.
Figure 2:
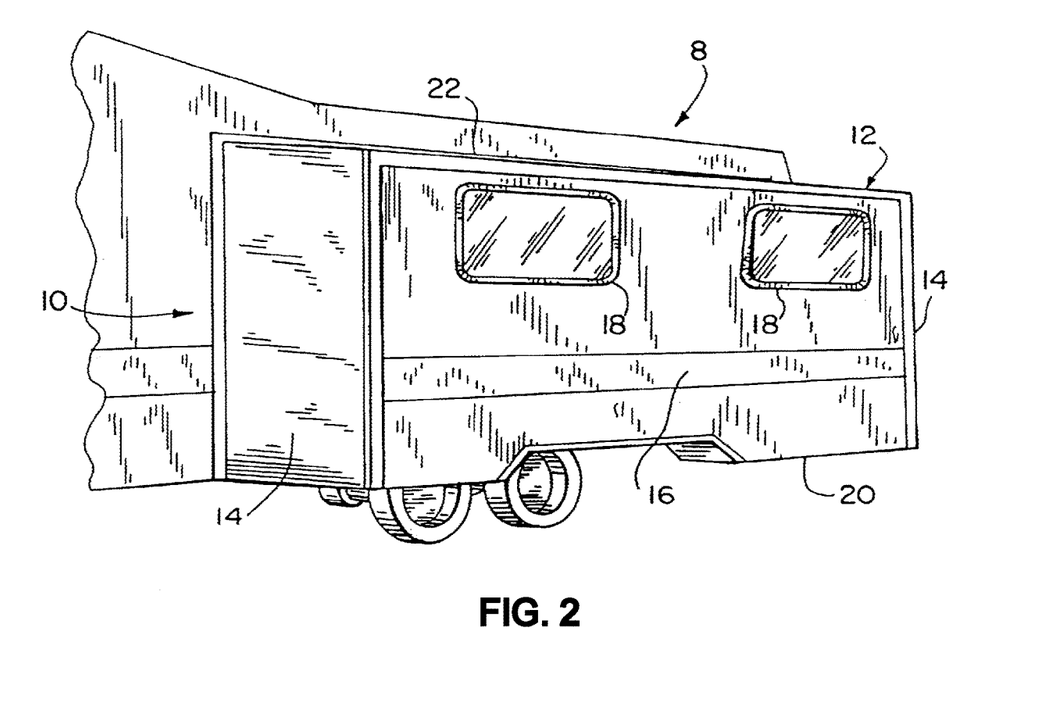
FIG. 2 is a partial perspective view of the slide-out room in an extended position.

Referring to FIGS. 1 and 2, a recreational vehicle 10 (generally referred to as a vehicle) is equipped with a laterally adjustable wing or slide-out room section used to provide additional interior space. It should be understood that the invention can also apply to expandable sections or compartments provided on other vehicles for use in construction, military, medical, education, mobile broadcast and other applications to expand the inside volume of a vehicle.

FIG. 1 illustrates the vehicle body 10 having mounted thereon an expandable, telescopic slide-out room section 12 incorporating the described embodiments in its fully retracted or inside position. FIG. 2 is a similar view with the slide-out section 12 in its fully extended or outside position. Slide-out section 12 may be rectangularly configured and includes a pair of sidewalls 14, an end wall 16, with two windows 18, a floor 20 and a roof 22. An arrangement for mounting the fixed frame assembly or outer rails of the described embodiments to the vehicle body 10 and driving the movement of the slide-out room section 12 is described in U.S. Pat. No. 5,758,918, the contents of which are hereby incorporated by reference. That system is an electric motor operated rack and pinion gear drive system for extending and retracting the slide-out frame assembly or inner rails relative to the outer rails.

Figure 3:
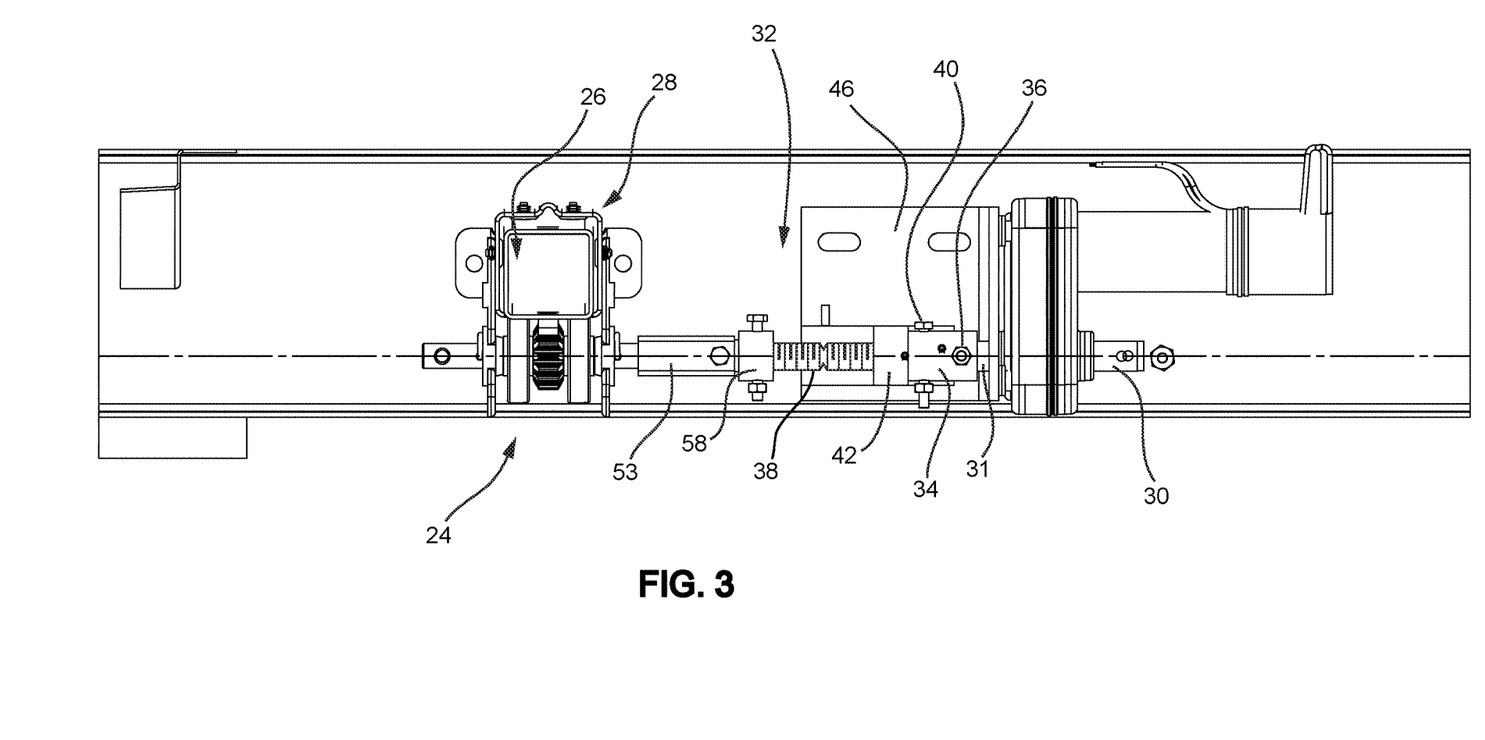
FIG. 3 shows the components of an exemplary construction including the drive system that drives the slide-out frame assembly between an inside position and an outside position.
Figure 4:
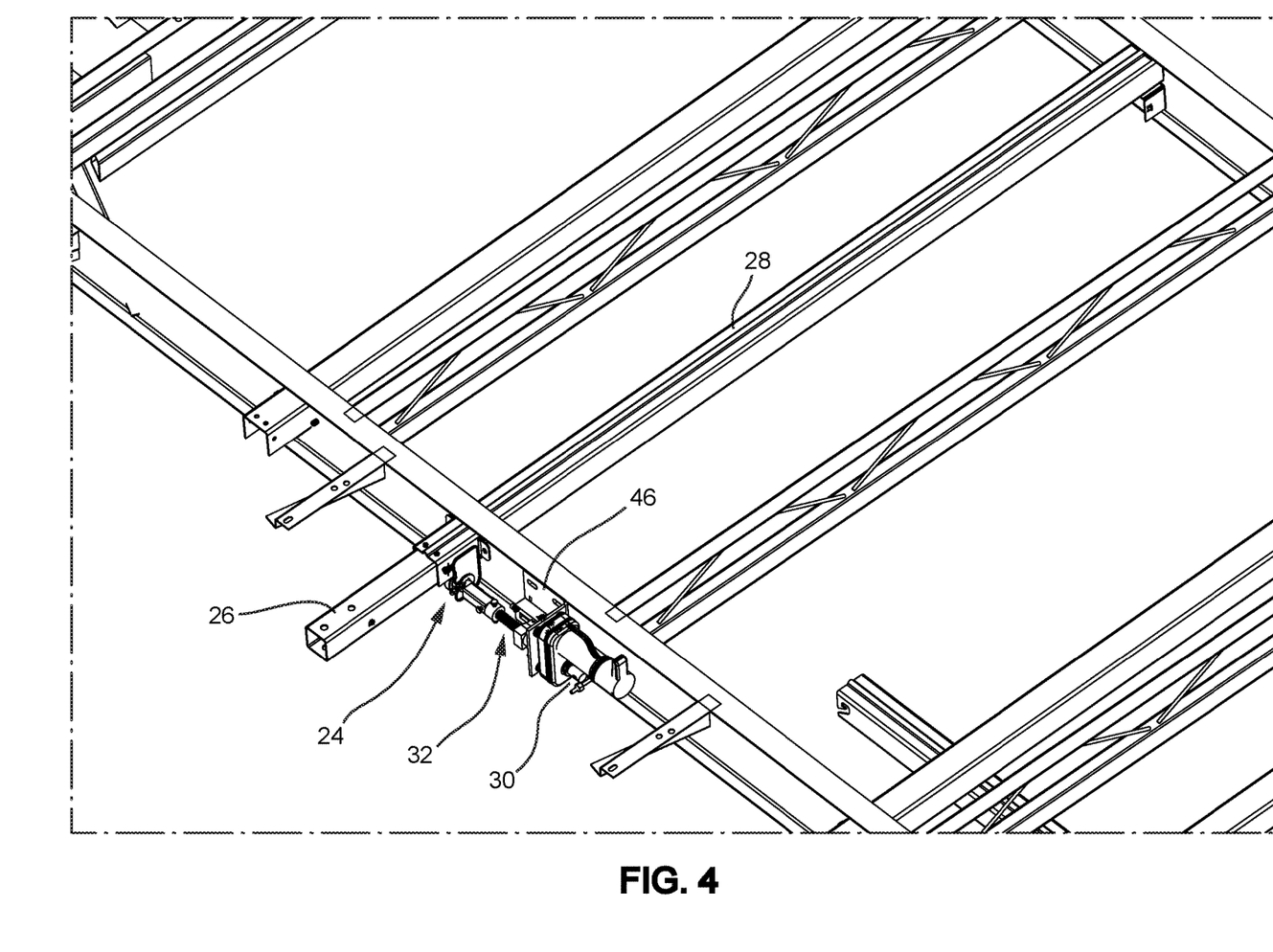
FIG. 4 shows the exemplary components of FIG. 3 coupled with the slide-out frame assembly.

An exemplary drive system 24 is shown in FIGS. 3 and 4. The slide-out frame assembly or inner rail 26 is displaceable by the drive system 24 relative to a fixed frame assembly or outer rail 28. The slide-out room section 12 is supported on and displaceable with the slide-out frame assembly 26. The electric motor 30 includes an output shaft 31 and drives the rack and pinion drive system 24 to position the slide-out room section 12 between the inside/fully retracted position and the outside/fully extended position. The motor stop mechanism 32 of the described embodiments is interposed between the motor 30 and the drive system 24.

Figure 5:
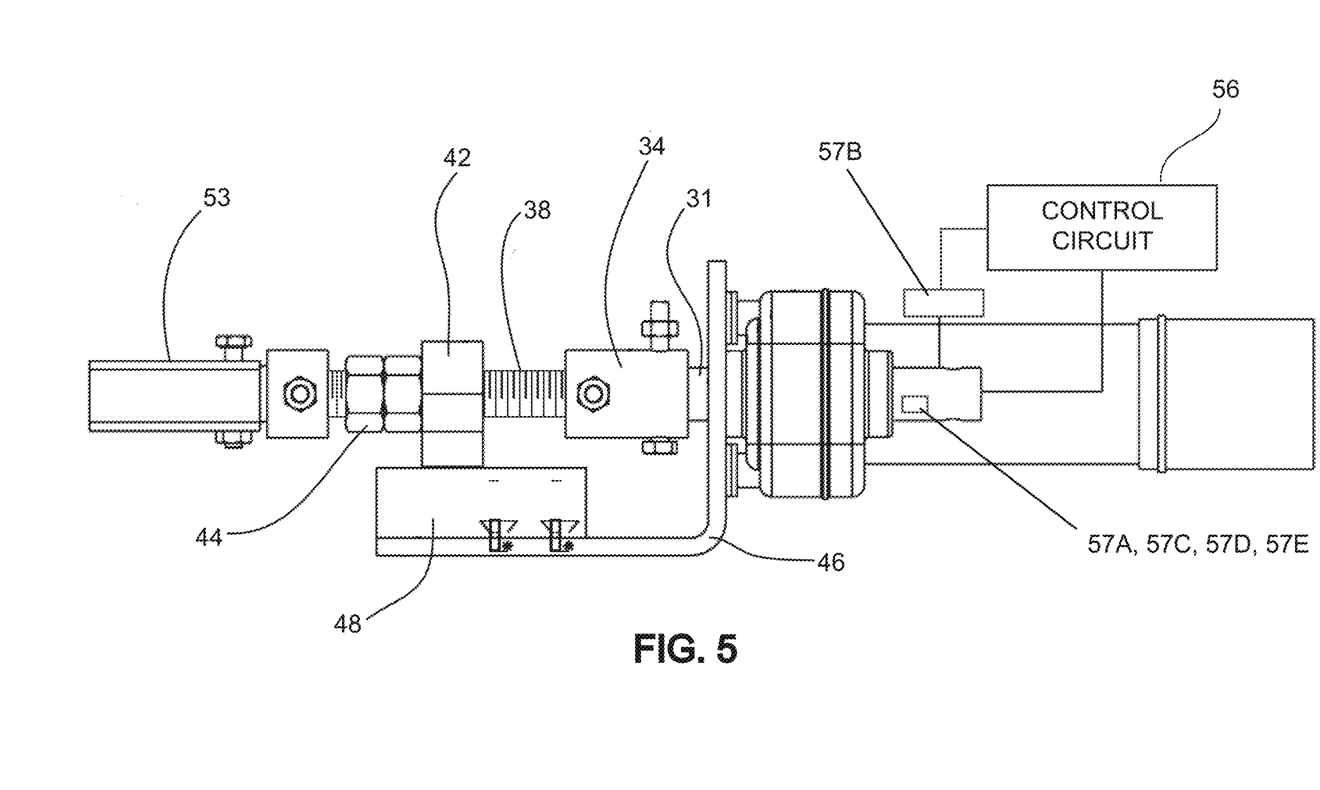
FIGS. 5-7 show details of an exemplary motor stop mechanism.
Figure 6:
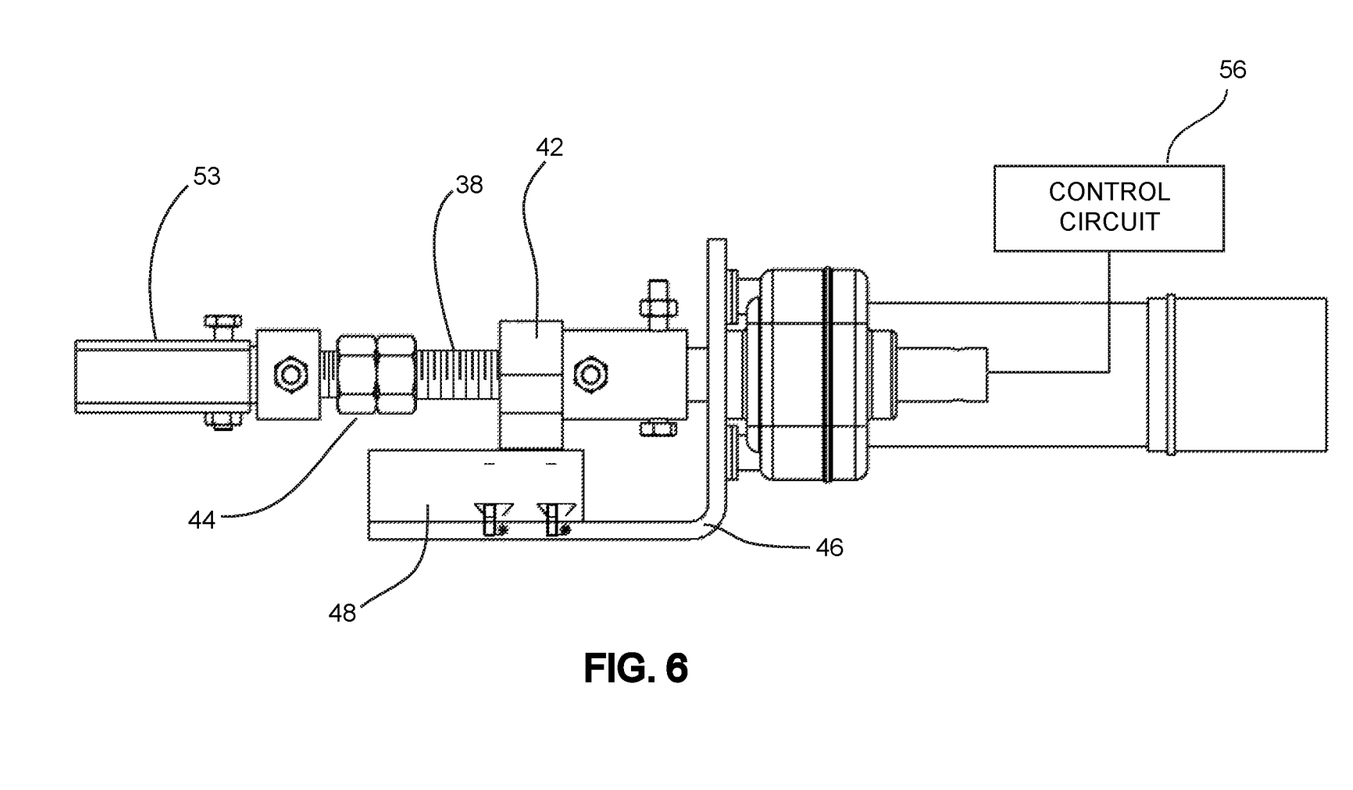
Figure 7:
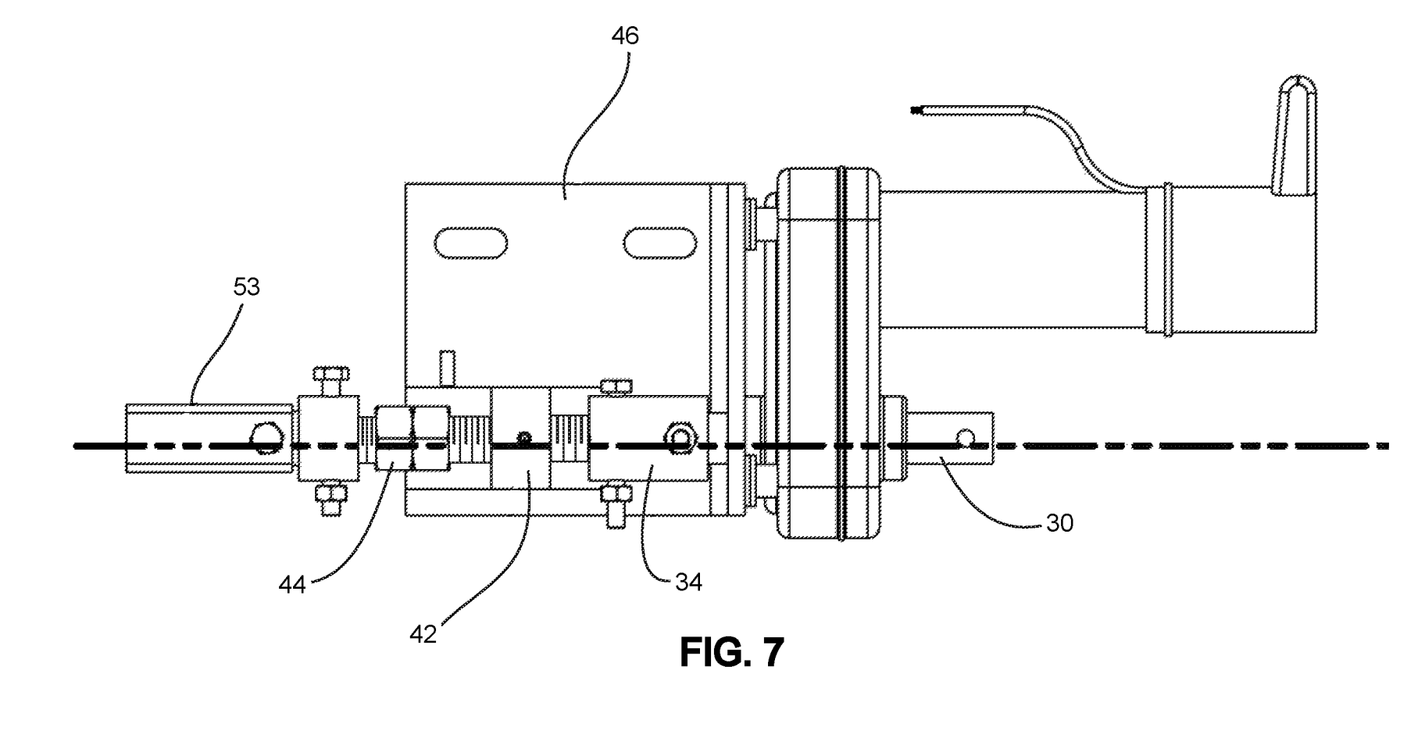

With continued reference to FIG. 3, the motor stop mechanism 32 acts between the motor 30 and the drive system 24. The motor stop mechanism 32 includes a coupler 34 that is pinned via a bolt 36 or the like to the motor output shaft 31. The coupler 34 is thus fixed to and rotatable with the output shaft 31. A threaded drive shaft 38 is fixed to the coupler 34 via a bolt 40 or the like such that the threaded drive shaft 38 is rotatable with the coupler 34. A trunnion 42 is threaded on the threaded drive shaft 38. The trunnion 42 is thus displaceable on the threaded drive shaft 38 with rotation of the threaded drive shaft 38. With reference to FIGS. 5 and 6, the trunnion 42 is displaceable between an extended position (FIG. 5) and a retracted position (FIG. 6) by forward and reverse rotation of the threaded drive shaft 38. FIG. 7 shows the trunnion 42 in an interim position. A stop limit 44 defines the extended position of the trunnion 42, which corresponds to the outside position of the slide-out frame assembly 26.

In some embodiments, the coupler 34 may serve as a stop limit for the trunnion 42 in the retracted position. Alternatively, specific structure may be added on or near the threaded drive shaft 38 in a path of the trunnion 42 for this purpose.

The motor stop mechanism further includes a motor mounting surface to support the motor. In some embodiments, the motor mounting surface is in the form of an L-shaped mounting bracket 46 through which the motor output shaft 31 is positioned. As shown in FIGS. 3 and 4, the mounting bracket 46 may be bolted to the framework supporting the fixed frame assembly 28. As shown, one leg of the L-shaped mounting bracket 46 extends generally parallel to and is positioned adjacent the threaded drive shaft 38. A track member 48 (FIGS. 5 and 6) is secured to the mounting bracket 46 via bolts or the like as shown.

Figure 8:
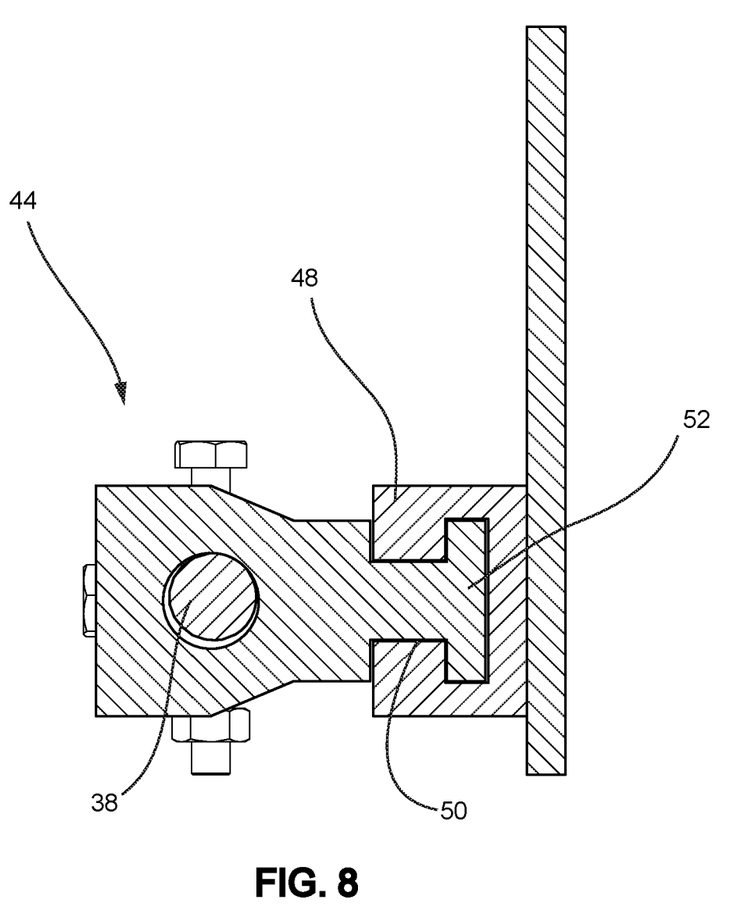
FIG. 8 is a sectional view showing the trunnion engaged with a track member.

In this embodiment, the trunnion 42 engages the track member 48. Specifically, the track member 48 includes an internal track 50, and the trunnion 42 includes a guide 52 positioned in the track 50. An exemplary track member 48 and track 50 are shown in FIG. 8. The track 50 is essentially T-shaped, and the guide 52 of the trunnion 42 is correspondingly shaped. That is, the guide 52 of the trunnion is shaped in complement to the shape of the track 50 such that the guide 52 positively engages the track 50. The track member 48 and track 50 serve to maintain the alignment of the trunnion 42 as it is displaced between its retracted and extended positions. Any complementary shape of the track 50 and guide 52 could be utilized.

Figure 7A:
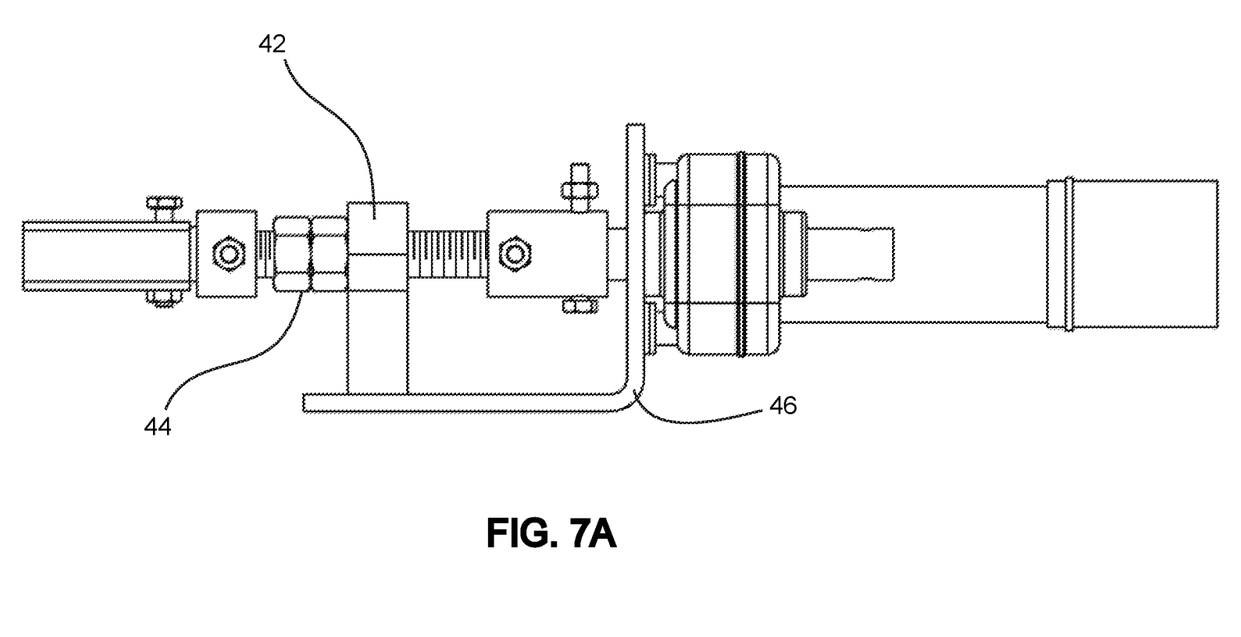
FIG. 7A shows a variation without a track member.

In a variation, the trunnion 42 may be engaged directly with the mounting bracket 46 as shown in FIG. 7A, i.e., without the track member 48. A flat distal end of the trunnion 42 in engagement with the flat surface of the bracket 46 serves to maintain the alignment of the trunnion 42 as it is displaced between its retracted and extended positions. The flat end of the trunnion 42 may be provided with a wear piece or the like to facilitate sliding contact, and/or a lubricant may be added to the bracket 46 and/or the trunnion 42.

A cross-shaft 53 is fixed to and rotatable with the threaded drive shaft 38 via a second coupler 58. The cross-shaft 53 may be provided with a non-circular cross section, such as square or rectangular, to engage a correspondingly-shaped pinion axle of the drive system 24.

Figure 9:
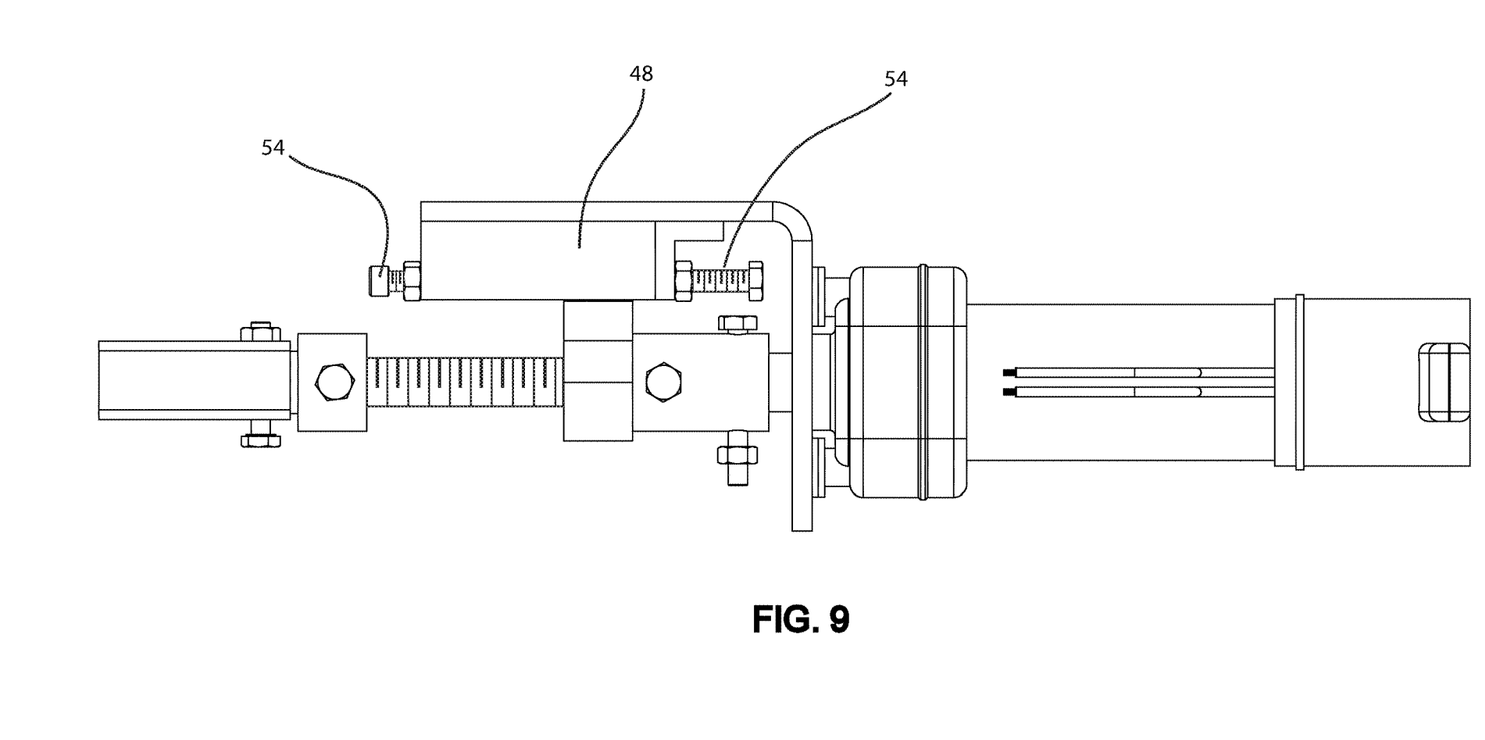
FIG. 9 shows an alternative embodiment utilizing jack bolts for defining the retracted and extended positions of the trunnion.

In the embodiment shown in FIGS. 5 and 6, the stop limit 44 is in the form of a double nut threaded onto the threaded drive shaft 38. Various alternative structural configurations could be used for the stop limit. For example, although the double nut configuration is preferred, a single stop nut could be used. FIG. 9 shows an alternative configuration incorporating one or more jack bolts 54 positioned in the track 50 in a path of the guide 52. The one or more jack bolts 54 may be secured in the track member 48 such that ends of the jack bolts 54 define the retracted and/or extended positions of the trunnion 42.

In use, a control circuit 56 may be connected with the motor 30, where the control circuit 56 is programmed to cut power to the motor 30 when the trunnion 42 reaches the extended position. That is, when the trunnion 42 reaches the stop limit 44, the stop limit provides a hard stop that causes the system to stop in place and allows for the motor 30 to cease running. In some embodiments, the motor 30 includes a clutch 57A, where the control circuit 56 is programmed to activate the clutch when the control circuit 56 detects that a torque limit is reached. In some embodiments, a resettable breaker 57B may be connected between the motor 30 and a power source for the motor, where the control circuit 56 is programmed to activate the resettable breaker to cut power to the motor 30 when the control circuit 56 detects that a current limit is reached. The control circuit 56 may be programmed to cut power to the motor 30 when the control circuit 56 detects a predetermined current change over a given time period. In some embodiments, the system may include a Hall effect sensor 57C that is configured to measure a power supply and monitor movement data, where the control circuit 56 is programmed to cut power to the motor 30 based on a signal from the Hall effect sensor. In some embodiments, the system may include an in-line torque sensor 57D coupled with the motor 30, where the control circuit 56 is programmed to cut power to the motor 30 when the in-line torque sensor detects a torque limit or a predefined change in torque over a given time period.

As an alternative to the control circuit 56, the system may include a limit switch 57E coupled with the motor that is tripped when the trunnion 42 reaches its extended position. As yet another alternative to the control circuit, the mechanism may be built internal to the motor gearbox. The motor may include multiple stages of gear reduction, and it may be possible to extend a secondary shaft off of an earlier gear reduction stage, thereby effectively increasing the working thread length, providing for more accurate position control. This internal design may also benefit from working in a lower torque range.

In some embodiments, the drive system 24 is configured such that the slide-out frame assembly is displaced linearly 4.7 inches per revolution of the motor shaft. Thus, 18 inches of linear travel is produced by about 3.8 revolutions of the motor shaft. The threaded drive shaft 38 may include a ⅝-11 thread, resulting in eleven turns per inch. As such, the aforementioned 3.8 revolutions causes the trunnion 42 to translate along the threaded drive shaft 38 approximately 0.35 inches. The stop limit 44 is positioned to allow only the desired translation of the trunnion 42.

Figure 10:
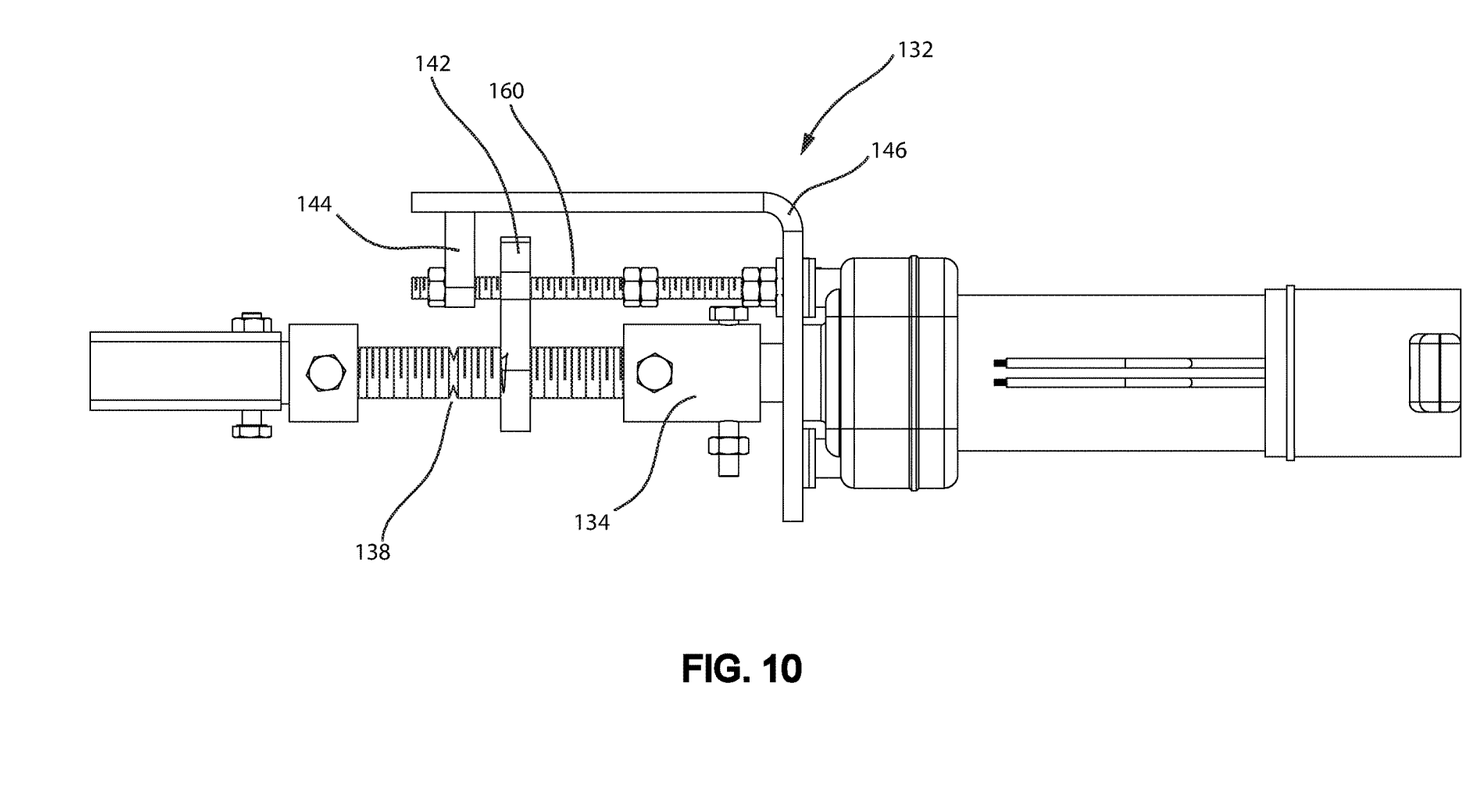
FIGS. 10 and 11 show another alternative embodiment incorporating a non-driven shaft.
Figure 11:
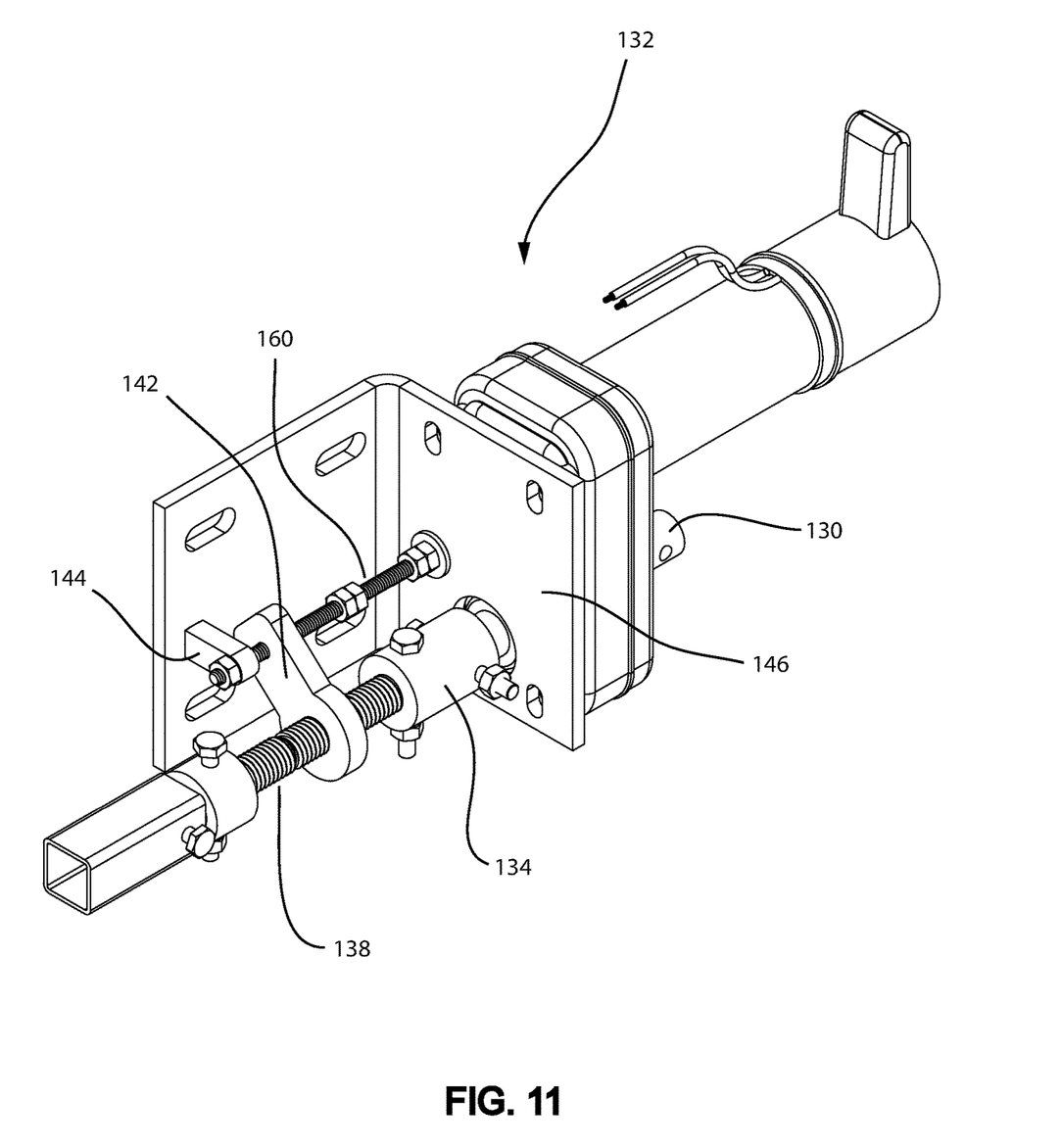

An alternative motor stop mechanism 132 is shown in FIGS. 10 and 11. In this embodiment, a non-driven shaft 160 is fixed to the mounting bracket 146 and oriented parallel with the threaded driving shaft 138. The trunnion 142 is connected between the threaded driving shaft 138 and the non-driven shaft 160. The stop limit 144 is in the form of a tab member or the like and is connected between the non-driven shaft 160 and the mounting bracket 146. In one construction, the stop limit 144 is welded to the mounting bracket 146.

In this embodiment, although the non-driven shaft 160 may be threaded to position hex nuts for securing the shaft 160 and/or defining a retracted position for the trunnion 142, the trunnion 142 includes an aperture that is sized larger than the non-driven shaft 160, and the trunnion 142 is thus displaced over the threads of the non-driven shaft 160 when being displaced between the extended and retracted positions on the threaded drive shaft 138. Like the first embodiment, when the trunnion 142 reaches the stop limit 144, operation of the motor is discontinued.

The motor stop mechanism of the described embodiments enables a through-frame system for a slide-out room section to stop at a desired point without allowing the room to run off the track and out of the vehicle. The stop limit(s) can be accurately set, and when the trunnion reaches the outer stop limit, the motor is caused to cease running, and the slide-out system stops in place.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A motor stop mechanism for a motor including an output shaft, the motor stop mechanism comprising:
   a motor mounting surface to which the motor is attachable, the motor output shaft being positionable through the motor mounting surface;
   a coupler fixable to and rotatable with the motor output shaft;
   a threaded drive shaft fixed to and rotatable with the coupler;
   a trunnion threaded on the threaded drive shaft and displaceable on the threaded drive shaft with rotation of the threaded drive shaft, wherein the trunnion is displaceable between a retracted position and an extended position by forward and reverse rotation of the threaded drive shaft;
   a stop limit defining the extended position of the trunnion; and
   an engaging output shaft coupled to and rotatable with the threaded drive shaft, the engaging output shaft being coupled to the threaded drive shaft on a side of the stop limit opposite from the trunnion and on an end of the threaded drive shaft opposite from the coupler, wherein the engaging output shaft is connectable to a drive system for displacing a load.

2. The motor stop mechanism according to claim 1, wherein the motor mounting surface comprises a mounting bracket positioned adjacent the threaded drive shaft, the motor stop mechanism further comprising a track member secured to the mounting bracket, wherein the trunnion engages the track member.

3. The motor stop mechanism according to claim 2, wherein the track member comprises a track, and wherein the trunnion comprises a guide positioned in the track.

4. The motor stop mechanism according to claim 3, wherein the guide of the trunnion is shaped in complement to a shape of the track such that the guide engages the track.

5. The motor stop mechanism according to claim 3, wherein the stop limit comprises at least one jack bolt positioned in the track in a path of the guide.

6. The motor stop mechanism according to claim 1, wherein the motor mounting surface comprises a mounting bracket positioned adjacent the threaded drive shaft, and wherein the trunnion directly engages the mounting bracket.

7. The motor stop mechanism according to claim 1, wherein the stop limit comprises a stop nut threaded onto the threaded drive shaft.

8. The motor stop mechanism according to claim 7, wherein the stop limit comprises a double nut threaded onto the threaded drive shaft.

9. The motor stop mechanism according to claim 1, further comprising:
   a mounting bracket; and a non-driven shaft fixed to the mounting bracket and parallel with the threaded drive shaft, wherein the trunnion is connected between the threaded drive shaft and the non-driven shaft, and wherein the stop limit is positioned on the non-driven shaft and separated from the threaded drive shaft.

10. The motor stop mechanism according to claim 9, wherein the stop limit is connected between the mounting bracket and the non-driven shaft.

11. A slide-out frame assembly including a slide-out frame displaceable relative to a fixed frame, the slide-out frame assembly comprising:
   a motor including an output shaft;
   a drive system coupled with the output shaft and engaging the slide-out frame, the drive system driving the slide-out frame linearly in a first direction between an inside position and an outside position; and
   a motor stop mechanism acting between the motor and the drive system, wherein the motor stop mechanism includes:
      a motor mounting surface to which the motor is attached, the motor output shaft being positioned through the motor mounting surface,
      a coupler fixed to and rotatable with the output shaft,
      a threaded drive shaft fixed to and rotatable with the coupler,
      a trunnion threaded on the threaded drive shaft and displaceable on the threaded drive shaft with rotation of the threaded drive shaft in a second direction perpendicular to the first direction, wherein the trunnion is displaceable between a retracted position and an extended position by forward and reverse rotation of the threaded drive shaft, and
      a stop limit defining the extended position of the trunnion,
   wherein the extended position of the trunnion corresponds to the outside position of the slide-out frame.

12. The slide-out frame assembly according to claim 11, further comprising a control circuit connected with the motor, the control circuit being programmed to cut power to the motor when the trunnion reaches the extended position.

13. The slide-out frame assembly according to claim 12, wherein the motor comprises a clutch, and wherein the control circuit is programmed to discontinue operation of the motor via the clutch when the control circuit detects that a torque limit is reached.

14. The slide-out frame assembly according to claim 12, further comprising a resettable breaker connected between the motor and a power source for the motor, wherein the control circuit is programmed to activate the resettable breaker to cut power to the motor when the control circuit detects that a current limit is reached.

15. The slide-out frame assembly according to claim 12, wherein the control circuit is programmed to cut power to the motor when the control circuit detects a predetermined current change over a given time period.

16. The slide-out frame assembly according to claim 12, further comprising a Hall effect sensor that is configured to measure a power supply and monitor movement data, wherein the control circuit is programmed to cut power to the motor based on a signal from the Hall effect sensor.

17. The slide-out frame assembly according to claim 12, further comprising an in-line torque sensor coupled with the motor, wherein the control circuit is programmed to cut power to the motor when the in-line torque sensor detects a torque limit or a predefined change in torque over a given time period.

18. The slide-out frame assembly according to claim 11, further comprising a limit switch coupled with the motor that is tripped when the trunnion reaches the extended position.

* * * * *